US012676305B2

(12) United States Patent
Kang et al.

(10) Patent No.: US 12,676,305 B2
(45) Date of Patent: Jul. 7, 2026

(54) NEGATIVE ACTIVE MATERIAL FOR RECHARGEABLE LITHIUM BATTERY AND RECHARGEABLE LITHIUM BATTERY INCLUDING SAME

(71) Applicant: SAMSUNG SDI CO., LTD., Yongin-si (KR)

(72) Inventors: Eunji Kang, Yongin-si (KR); Young-Min Kim, Yongin-si (KR); Sunil Park, Yongin-si (KR); Jongmin Won, Yongin-si (KR); Doori Oh, Yongin-si (KR); Dae-Hyeok Lee, Yongin-si (KR); Changsu Shin, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 219 days.

(21) Appl. No.: 18/386,097

(22) Filed: Nov. 1, 2023

(65) Prior Publication Data

US 2024/0243261 A1 Jul. 18, 2024

(30) Foreign Application Priority Data

Jan. 13, 2023 (KR) ........................ 10-2023-0005712

(51) Int. Cl.
*H01M 4/36* (2006.01)
*C01B 32/159* (2017.01)
(Continued)

(52) U.S. Cl.
CPC ........... *H01M 4/366* (2013.01); *C01B 32/159* (2017.08); *C01B 33/02* (2013.01); *H01M 4/133* (2013.01);
(Continued)

(58) Field of Classification Search
CPC ...... H01M 4/366; H01M 4/133; H01M 4/134; H01M 4/386; H01M 4/587;
(Continued)

(56) References Cited

U.S. PATENT DOCUMENTS

2010/0193731 A1 8/2010 Lee et al.
2016/0197343 A1 7/2016 Jeong et al.
(Continued)

FOREIGN PATENT DOCUMENTS

CN 108461723 * 8/2018 ........ H01M 10/0525
CN 109686952 A * 4/2019 ............ H01M 4/366
(Continued)

OTHER PUBLICATIONS

Park et al. "Three-dimensional porous pitch-derived carbon coated Si nanoparticles-CNT composite microsphere with superior electrochemical performance for lithium ion batteries." Journal of Alloys and Compounds 821 (2020) 153224 (Year: 2020).*
(Continued)

*Primary Examiner* — Michael L Dignan
(74) *Attorney, Agent, or Firm* — Lee IP Law, P.C.

(57) ABSTRACT

A negative active material for a rechargeable lithium battery, the negative active material including a core having silicon and a first carbon nanotube, an amorphous carbon coating layer surrounding the core, and a second carbon nanotube adhered to the amorphous carbon coating layer.

16 Claims, 2 Drawing Sheets

(51) Int. Cl.

| | |
|---|---|
| ***C01B 33/02*** | (2006.01) |
| ***H01M 4/133*** | (2010.01) |
| ***H01M 4/134*** | (2010.01) |
| ***H01M 4/38*** | (2006.01) |
| ***H01M 4/587*** | (2010.01) |
| *H01M 4/02* | (2006.01) |

(52) U.S. Cl.

CPC .......... *H01M 4/134* (2013.01); *H01M 4/386* (2013.01); *H01M 4/587* (2013.01); *C01B 2202/02* (2013.01); *C01B 2202/06* (2013.01); *C01B 2202/22* (2013.01); *C01B 2202/34* (2013.01); *C01P 2004/62* (2013.01); *C01P 2004/64* (2013.01); *C01P 2006/40* (2013.01); *H01M 2004/021* (2013.01); *H01M 2004/027* (2013.01)

(58) Field of Classification Search

CPC ..... H01M 2004/021; H01M 2004/027; H01M 4/62; H01M 4/625; H01M 10/052; H01M 10/058; C01B 32/159; C01B 33/02; C01B 2202/02; C01B 2202/06; C01B 2202/22; C01B 2202/34; C01B 32/05; C01P 2004/62; C01P 2004/64; C01P 2006/40; Y02E 60/10; B82Y 40/00

See application file for complete search history.

(56) References Cited

U.S. PATENT DOCUMENTS

| | | | | |
|---|---|---|---|---|
| 2020/0099043 | A1* | 3/2020 | Bogart | H01M 4/625 |
| 2021/0167369 | A1* | 6/2021 | Park | C01B 33/113 |
| 2021/0399289 | A1* | 12/2021 | Eshraghi | H01M 4/1395 |
| 2022/0325105 | A1* | 10/2022 | Oh | H01M 4/364 |
| 2022/0367855 | A1* | 11/2022 | Oh | H01M 10/052 |
| 2023/0238517 | A1* | 7/2023 | Lee | H01M 4/1395<br>429/231.8 |

FOREIGN PATENT DOCUMENTS

| | | | | |
|---|---|---|---|---|
| CN | 111525110 | A | 8/2020 | |
| CN | 111668472 | * | 9/2020 | H01M 4/583 |
| CN | 111668472 | A | 9/2020 | |
| KR | 10-1604081 | B1 | 3/2016 | |
| KR | 10-2016-0085089 | A | 7/2016 | |
| KR | 20200133134 | A * | 11/2020 | C01B 32/168 |
| KR | 10-2021-0012801 | A | 2/2021 | |
| KR | 10-2021-0038364 | A | 4/2021 | |

OTHER PUBLICATIONS

Park et al. "Highly conductive carbon nanotube micro-spherical network for high-rate silicon anode." Journal of Power Sources 394 (2018) 94-101. (Year: 2018).*

CN 108461723 machine English translation (Year: 2018).*

CN 109686952 machine English translation (Year: 2019) (Year: 2019).*

CN 111668472 machine English translation (Year: 2020).*

Wang et al. "Microspheres of Si@Carbon-CNTs composites with a stable 3D interpenetrating structure applied in high-performance lithium-ion battery." Journal of Colloid and Interface Science 629 (2023) 511-521 (Year: 2022).*

Kim et al. "Three-dimensional assembly of multiwalled carbon nanotubes for creating a robust electron-conducting network in silicon-carbon microsphere-based electrodes." Nature: Scientific Reports (2020) 10:2342 (Year: 2020).*

Extended European Search Report dated Jun. 19, 2024, of the corresponding European Patent Application No. 24150506.4.

Korean Office action dated Jul. 4, 2025.

* cited by examiner

NEGATIVE ACTIVE MATERIAL FOR RECHARGEABLE LITHIUM BATTERY AND RECHARGEABLE LITHIUM BATTERY INCLUDING SAME

CROSS-REFERENCE TO RELATED APPLICATION

This application claims priority to and the benefit of Korean Patent Application No. 10-2023-0005712, filed in the Korean Intellectual Property Office on Jan. 13, 2023, the entire contents of which are incorporated herein by reference.

BACKGROUND

1. Field

Embodiments relate to a negative active material for a rechargeable lithium battery and a rechargeable lithium battery including same.

2. Description of the Related Art

Recently, the rapid development of electronic devices such as mobile phones, laptop computers, and electric vehicles using batteries has resulted in surprising increases in demand for rechargeable batteries with relatively high capacity and lighter weight. For example, a rechargeable lithium battery has recently drawn attention as a driving power source for portable devices, as it has lighter weight and high energy density. Accordingly, research for improving performance of rechargeable lithium is actively being conducted.

SUMMARY

Embodiments are directed to a negative active material for a rechargeable lithium battery, the negative active material including a core including silicon and a first carbon nanotube, an amorphous carbon coating layer surrounding the core, and a second carbon nanotube adhered to the amorphous carbon coating layer.

In embodiments the first and second carbon nanotubes may each independently be a single-walled carbon nanotube, a double-walled carbon nanotube, a multi-walled carbon nanotube, or a combination thereof.

In embodiments the first carbon nanotube may be a single-walled carbon nanotube, and the second carbon nanotube may be a multi-walled carbon nanotube.

In embodiments a total amount of the first and second carbon nanotubes may be about 10 wt % or less, based on a total weight of the negative active material.

In embodiments a total amount of the first and second carbon nanotubes may be about 0.0001 wt % to about 10 wt %, based on a total weight of the negative active material.

In embodiments a total amount of the first and second carbon nanotubes may be about 0.0002 wt % to about 5 wt %, based on a total weight of the negative active material.

In embodiments a total amount of the first and second carbon nanotubes may be about 0.0003 wt % to about 3 wt %, based on a total weight of the negative active material.

In embodiments a total amount of the first and second carbon nanotubes may be about 0.0005 wt % to about 1 wt %, based on a total weight of the negative active material.

In embodiments an amount of the silicon may be about 10% to about 80%, based on a total weight of the negative active material.

In embodiments an amount of the silicon may be about 10% to about 70%, based on a total weight of the negative active material.

In embodiments the silicon may have an average particle diameter of about 10 nm to about 1,000 nm.

In embodiments the silicon may have an average particle diameter of about 20 nm to about 900 nm.

In embodiments the amorphous carbon coating layer may have a thickness of about 1 nm to about 2 μm.

In embodiments the amorphous carbon coating layer may have a thickness of about 1 nm to about 500 nm.

In embodiments the amorphous carbon coating layer may have a thickness of about 10 nm to about 300 nm.

In embodiments the amorphous carbon coating layer may have a thickness of about 20 nm to about 200 nm.

In embodiments the amorphous carbon coating layer may include soft carbon, hard carbon, mesophase pitch carbide, sintered cokes, or a combination thereof.

In embodiments the second carbon nanotube may have an average length of about 1 μm to about 50 μm.

Embodiments are directed to a rechargeable lithium battery, including a negative electrode including the negative active material, a positive electrode, and an electrolyte.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. As used herein, the term "or" is not an exclusive term, e.g., "A or B" would include A, B, or A and B."

In the present disclosure, when a definition is not otherwise provided, a particle diameter indicates an average particle diameter or size (D50) where a cumulative volume is about 50 volume % in a particle size distribution. The average particle size (D50) may be measured by a suitable method, for example, by a particle size analyzer, or by a transmission electron microscopic image, or a scanning electron microscopic image. Alternatively, a dynamic light-scattering measurement device may be used to perform a data analysis, and the number of particles may be counted for each particle size range, and from this, the average particle diameter (D50) value may be easily obtained through a calculation. It may be measured by a laser diffraction method. The laser diffraction may be obtained by distributing particles to be measured in a distribution solvent and introducing it to a commercially available laser diffraction particle measuring device (e.g., MT 3000 available from Microtrac, Ltd.), irradiating ultrasonic waves of about 28 kHz at a power of 60 W, and calculating an average particle diameter (D50) in the 50% standard of particle distribution in the measuring device.

Figure 1:
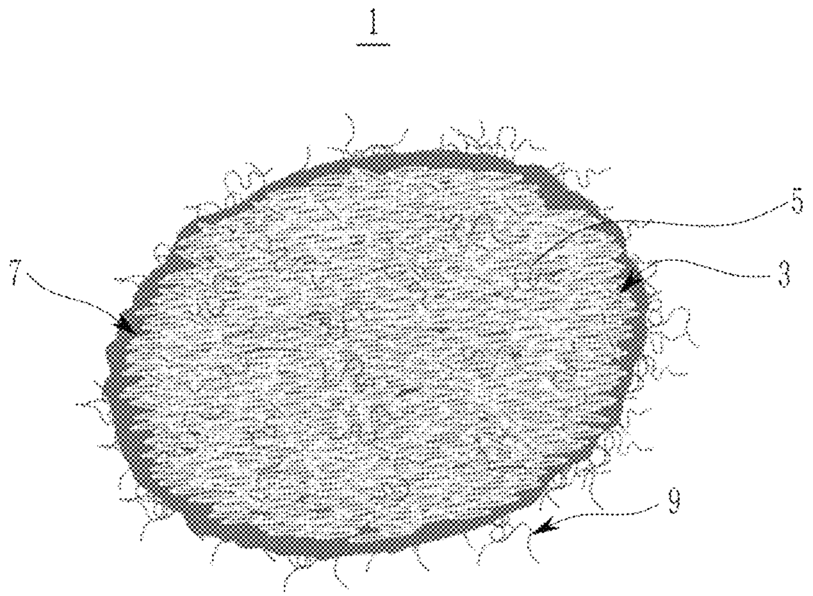
FIG. 1 is a schematic diagram of a negative active material for a rechargeable lithium battery according to one or more embodiment.

A negative active material for a rechargeable lithium battery according to one or more embodiments may include a core including silicon and a first carbon nanotube; an amorphous carbon coating layer surrounding the core; and a second carbon nanotube adhered to the amorphous carbon coating layer. FIG. 1 shows such a negative active material 1 and the core includes silicon 3 and a first carbon nanotube 5, the core is surrounded with an amorphous carbon coating layer 7, and the second carbon nanotube 9 is adhered to the amorphous carbon coating layer 7.

As such, in the negative active material according to one or more embodiments, the first carbon nanotube may form a core together with silicon to locate the first carbon nanotube between the silicon, improving conductivity and to well connect the silicon, thereby constantly maintaining the gap between the silicon. The adherence of the second carbon nanotube to the amorphous carbon coating layer may improve the contact between the active materials. This may help enable an increase in the initial efficiency and the cycle-life characteristics in the negative active material according to one or more embodiments.

If a carbon nanotube were not included in the core and were only adhered to the amorphous carbon coating layer, the effect for improving conductivity and the connection between the silicon may not be realized, thereby reducing the effect by using carbon nanotube. If a carbon nanotube were only included in the core and were not adhered to the amorphous carbon coating layer, the contact between the active materials may not be improved.

In an implementation, the core may include a carbon nanotube, and even if the carbon nanotubes are included in the negative active material in a small amount, e.g., about 10 wt % or less based on the total 100 wt % of the negative active material, the effect of using carbon nanotubes may be suitably obtained. In one or more embodiments, an amount of carbon nanotubes may be about 10 wt % or less, about 0.0001 wt % to about 10 wt %, about 0.0002 wt % to about 5 wt %, about 0.0003 wt % to about 3 wt %, or about 0.0005 wt % to about 1 wt % based on the total 100 wt % of the negative active material. If the total amount of the first and the second carbon nanotube is within these ranges, the effects of using carbon nanotubes may be appropriately obtained and the core may be uniformly prepared.

In one or more embodiments, it may be important for the total amount of the first and the second carbon nanotube, and each amount of the first and the second carbon nanotube to be suitably controlled. In an implementation, the amounts thereof may be the same or different.

The first and the second carbon nanotube may be the same or different and each may be a single-walled carbon nanotube, a double-walled carbon nanotube, a multi-walled carbon nanotube, or a combination thereof.

In one or more embodiments, the first carbon nanotube may be a single-walled carbon nanotube and the second carbon nanotube may be a multi-walled carbon nanotube.

In one or more embodiments, an amount of the silicon may be about 10 wt % to about 80 wt %, or about 10 wt % to about 70 wt % based on the total 100 wt % of the negative active material. The amount of the silicon may be suitably adjusted within the range.

In one or more embodiments, the silicon may have an average particle diameter of about 10 nm to about 30 μm. The average particle diameter of the silicon particle may be about 10 nm to about 1,000 nm, about 20 nm to about 900 nm, about 20 nm to about 800 nm, about 20 nm to about 600 nm, about 20 nm to about 150 nm. If the silicon has the average particle diameter of the range, a side reaction between the negative active material and the electrolyte may be further suppressed.

The core may further include amorphous carbon. In the preparation of amorphous carbon coating layer, amorphous carbon may be partially inserted to an inside of the core, and thus, the core may include amorphous carbon.

An average length of the second carbon nanotube adhered to the amorphous carbon coating layer may be about 1 μm to about 50 μm, about 2 μm to about 30 μm, or about 5 μm to about 20 μm. If the average length of the second carbon nanotube is within these ranges, the connections between the active materials may be more effectively generated.

The average length of the second carbon nanotube does not mean only the complete straight line length, it may be a length corresponding to the long axis.

An amount of the amorphous carbon may be about 10 wt % to about 80 wt %, or about 10 wt % to about 70 wt % based on the total 100 wt % of the negative active material. An amount of the amorphous carbon may be appropriately adjusted within these ranges. An amount of the amorphous carbon may not only be the amorphous carbon coating layer, and may also include an amount included in the core, and thus, may be a total amount of amorphous carbon included in the negative active material.

In one or more embodiments, a thickness of the amorphous carbon coating layer may be about 1 nm to about 2 μm, about 1 nm to about 500 nm, about 10 nm to about 300 nm, or about 20 nm to about 200 nm. If the thickness of the amorphous carbon coating layer is within these ranges, the silicon volume expansion during charging and discharge may be effectively suppressed.

The amorphous carbon may be soft carbon, hard carbon, mesophase pitch carbide, sintered cokes, or a combination thereof.

A negative active material according to embodiments may be prepared by the following procedures.

Silicon may be mixed with a first carbon nanotube and spray-dried. An amount of the first carbon nanotube may be suitably adjusted until an amount of carbon nanotube included in the final negative active material is about 10 wt % or less, e.g., about 0.0001 wt % to about 10 wt %, about 0.0002 wt % to about 5 wt %, about 0.0003 wt % to about 3 wt %, or 0.0005 wt % to 1 wt %.

The silicon may be silicon nano particles with nano sizes. Such silicon nano particles may be commercially available, or may be prepared by mixing silicon particles with micrometer sizes with an organic solvent. The mixing process may be performed by a milling process, thereby reducing the size of the silicon particles from micrometers to nanometers and obtaining silicon nanoparticles. The milling process may be performed by a bead mill or a ball mill.

The organic solvent may suitably be alcohols which do not oxidize the silicon particles, and may be readily volatilized, and in an implementation may include, e.g., isopropyl alcohol, ethanol, methanol, butanol, N-methyl pyrrolidone, propylene glycol, or combinations thereof. An amount of the organic solvent may be used in order to have a mixing ratio of the organic solvent and the silicon particle to be about 99:1 to about 70:30, about 97:3 to about 75:25, about 95:5 to about 80:20.

After mixing the silicon particle and the organic solvent, a dispersant may be further added. A weight ratio of the silicon nano particle and the dispersant may be about 99:1 to about 80:20, in one or more embodiments, about 97:3 to 85:15, or in another embodiment, about 95:5 to about 87:13.

As a dispersant, any dispersant may be used as long as it may well distribute silicon particles, e.g., stearic acid may be used.

The spray-drying may be carried out using a spray dryer at about 120° C. to about 200° C. The spray-dried product prepared by the process may be secondary particles in which a plurality of the silicon nano particles may be agglomerated.

Thereafter, the spray-dried product may be mixed with an amorphous carbon precursor. The amorphous carbon precursor may be, e.g., a phenolic resin, a furan resin, an epoxy resin, polyacrylonitrile, a polyamide resin, polyimide resin, a polyamide imide resin, synthetic pitch, petroleum pitch, a coal-based pitch, meso pitch, tar, or a combination thereof. Among these, meso pitch may be suitable, considering the economic aspects.

A mixing ratio of the spray-dried product and the amorphous carbon precursor may be a weight ratio of about 95:5 to about 30:70, or a weight ratio of about 90:10 to about 40:60.

A second carbon nanotube may be added to the resulting mixture and heat-treated.

An amount of the second carbon nanotube may be suitably adjusted until an amount of carbon nanotube included in the final negative active material is to be about 10 wt % or less, e.g., about 0.0001 wt % to about 10 wt %, about 0.0002 wt % to about 5 wt %, about 0.0003 wt % to about 3 wt %, or 0.0005 wt % to 1 wt %.

The heat-treatment may be performed at about 600° C. to about 1,200° C., about 650° C. to about 1,100° C., e.g., about 700° C. to about 1,000° C. The process may convert the amorphous carbon precursor into an amorphous carbon. The heat-treatment may be performed under an $N_2$ atmosphere, an argon atmosphere, or a combination thereof. The heat-treatment may be performed for about 1 hour to about 5 hours, or about 1 hour to about 3 hours.

A rechargeable lithium battery according to one or more embodiments may include a negative electrode, a positive electrode, and an electrolyte.

The negative electrode may include a current collector and a negative active material layer on at least one surface of the current collector. The negative active material layer may include the negative active material according to one or more embodiments. The negative active material may include the negative active material as a first active material and crystalline carbon as a second active material. The negative active material according to one or more embodiments may include the second carbon nanotube adhered to the amorphous carbon coating layer, e.g., the second carbon nanotube may be positioned on the surface, so that the first active material may readily connect with the second active material through the second nanotube and this connection may be effectively maintained.

The crystalline carbon may include artificial graphite, natural graphite, or combinations thereof.

If the first active material and the second active material are included as the negative active material, a mixing ratio of the first active material and the second active material may be about 99.9:0.1 wt % to about 3:97 wt %, about 50:50 wt % to about 3:97 wt %, or about 40:60 wt % to about 4:96 wt %. If the mixing ratio of the first active material and the second active material is within these ranges, the volume expansion of the negative active material may be effectively suppressed and the conductivity may be further improved.

In the negative active material layer, an amount of the negative active material may be about 95 wt % to about 99 wt % based on the total 100 wt % of the negative active material layer. An amount of the negative active material may be an amount of the active material according to one or more embodiments, or may be an amount of the total mixture, if the first active material and the second active material are used as the negative active material.

The negative active material layer may include a binder, and may further include a conductive material.

An amount of the binder may be about 1 wt % to about 5 wt % based on the total 100 wt % of the negative active material layer.

The binder may improve the binding properties of the negative active material particles with one another and with a current collector. The binder may be a non-aqueous binder, an aqueous binder, or a combination thereof.

The non-aqueous binder may be an ethylene propylene copolymer, polyacrylonitrile, polystyrene, polyvinylchloride, carboxylated polyvinylchloride, polyvinyl fluoride, polyurethane, polytetrafluoroethylene, polyvinylidene fluoride, polyethylene, polypropylene, polyamide imide, polyimide, or combinations thereof.

The aqueous binder may be a styrene-butadiene rubber, an acrylated styrene-butadiene rubber (ABR), an acrylonitrile-butadiene rubber, an acrylic rubber, a butyl rubber, a fluorine rubber, an ethylene oxide-containing polymer, polyvinyl pyrrolidone, polypropylene, polyepichlorohydrin, polyphosphazene, an ethylene propylene diene copolymer, polyvinyl pyridine, chlorosulfonated polyethylene, latex, a polyester resin, an acrylic resin, a phenolic resin, an epoxy resin, polyvinyl alcohol, or combinations thereof.

If the aqueous binder is used as a negative electrode binder, a cellulose-based compound may be further used to provide viscosity as a thickener. The cellulose-based compound may include, e.g., carboxymethyl cellulose, hydroxypropylmethyl cellulose, methyl cellulose, or alkali metal salts thereof. The alkali metal may be Na, K, or Li. The thickener may be included in an amount of about 0.1 parts by weight to about 3 parts by weight based on 100 parts by weight of the negative active material.

An amount of the conductive material may be about 1 wt % to about 5 wt % based on the total 100 wt % of the negative active material layer.

The conductive material may be included to provide electrode conductivity, and any electrically conductive material may be used as a conductive material unless it causes a chemical change. In an implementation, the conductive material may be, e.g., a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may include, e.g., a copper foil, a nickel foil, a stainless steel foil, a titanium foil, a nickel foam, a copper foam, a polymer substrate coated with a conductive metal, and a combination thereof.

The positive electrode may include a current collector and a positive active material layer formed on the current collector.

The positive electrode active material may include lithiated intercalation compounds that reversibly intercalate and deintercalate lithium ions. In some embodiments, one or more composite oxides of a metal, e.g., cobalt, manganese, nickel, and a combination thereof, and lithium, may be used.

In an implementation, the compounds represented by, e.g., the following chemical formulae may be used. $Li_aA_{1-b}X_bD_2$ ($0.90 \le a \le 1.8$, $0 \le b \le 0.5$); $Li_aA_{1-b}X_bO_{2-c}D_c$ ($0.90 \le a \le 1.8$, $0 \le b \le 0.5$, $0 \le c \le 0.05$); $Li_aE_{1-b}X_bO_{2-c}D_c$ ($0.90 \le a \le 1.8$, $0 \le b \le 0.5$, $0 \le c \le 0.05$); $Li_aE_{2-b}X_bO_{4-c}D_c$ ($0.90 \le a \le 1.8$, $0 \le b \le 0.5$, $0 \le c \le 0.05$); $Li_aNi_{1-b-c}Co_bX_cD_\alpha$ ($0.90 \le a \le 1.8$, $0 \le b \le 0.5$, $0 \le c \le 0.5$, $0 < \alpha \le 2$); $Li_aNi_{1-b-c}Co_bX_cO_{2-\alpha}T_\alpha$ ($0.90 \le a \le 1.8$, $0 \le b \le 0.5$, $0 \le c \le 0.5$, $0 < \alpha < 2$); $Li_aNi_{1-b-c}Co_bX_cO_{2-\alpha}T_2$ ($0.90 \le a \le 1.8$, $0 \le b \le 0.5$, $0 \le c \le 0.5$, $0 < \alpha < 2$); $Li_aNi_{1-b-c}Mn_bX_cD_\alpha$ ($0.90 \le a \le 1.8$, $0 \le b \le 0.5$, $0 \le c \le 0.5$, $0 < \alpha \le 2$); $Li_aNi_{1-b-c}Mn_bX_cO_{2-\alpha}T_\alpha$ ($0.90 \le a \le 1.8$, $0 \le b \le 0.5$, $0 \le c \le 0.5$, $0 < \alpha < 2$); $Li_aNi_{1-b-c}Mn_bX_cO_{2-\alpha}T_2$ ($0.90 \le a \le 1.8$, $0 \le b \le 0.5$, $0 \le c \le 0.5$, $0 < \alpha < 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_bCo_cMn_dG_eO_2$ ($0.90 \le a \le 1.8$, $0 \le b \le 0.9$, $0 \le c \le 0.5$, $0 \le d \le 0.5$, $0 \le e \le 0.1$); $Li_aNi_bCo_cAl_dG_eO_2$ ($0.90 \le a \le 1.8$, $0 \le b \le 0.9$, $0 \le c \le 0.5$, $0 \le d \le 0.5$, $0 \le e \le 0.1$); $Li_aNi_bCo_cL^1{}_dG_eO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$); $Li_aCoG_bO_2$ ($0.90 \le a \le 1.8$, $0.001 \le b \le 0.1$); $Li_aMn_{1-b}G_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMn_{1-g}G_gPO_4$ ($0.90 \le a \le 1.8$, $0 \le g \le 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $Li_aFePO_4$ ($0.90 \le a \le 1.8$)

In the above chemical formulas, A may be, e.g., Ni, Co, Mn, or a combination thereof, X may be, e.g., Al, Ni, Co, Mn, Cr, Fe, Mg, Sr, V, a rare earth element, or a combination thereof, D may be, e.g., O, F, S, P, or a combination thereof, E may be, e.g., Co, Mn, or a combination thereof, T may be, e.g., F, S, P, or a combination thereof, G may be, e.g., Al, Cr, Mn, Fe, Mg, La, Ce, Sr, V, or a combination thereof, Q may be, e.g., Ti, Mo, Mn, or a combination thereof, Z may be, e.g., Cr, V, Fe, Sc, Y, or a combination thereof, J may be, e.g., V, Cr, Mn, Co, Ni, Cu, or a combination thereof, $L^1$ may be, e.g., Al, or a combination thereof.

The compounds may have a coating layer on the surface, or may be mixed with another compound having a coating layer. The coating layer may include a coating element compound, e.g., an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or mixture thereof. The coating layer may be provided by a method having no adverse influence on properties of a positive electrode active material by using these elements in the compound, and, e.g., the method may include any coating method such as spray coating, dipping, and the like, but is not illustrated in more detail since it is well-known in the related field.

In the positive electrode, an amount of the positive active material may be about 90 wt % to about 98 wt % based on the total weight of the positive active material layer.

In embodiments, the positive active material layer may further include a binder and a conductive material. The binder and the conductive material may be included in an amount of about 1 wt % to about 5 wt %, respectively based on the total amount of the positive active material layer.

The binder may improve binding properties of positive active material particles with one another and with a current collector. In an implementation the binder may be, e.g., polyvinyl alcohol, carboxymethyl cellulose, hydroxypropyl cellulose, diacetyl cellulose, polyvinylchloride, carboxylated polyvinylchloride, polyvinyl fluoride, an ethylene oxide-containing polymer, polyvinyl pyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like.

The conductive material may be included to provide electrode conductivity, and any electrically conductive material may be used as a conductive material unless it causes a chemical change. In an implementation, the conductive material may include, e.g., a carbon-based material such as natural graphite, artificial graphite, carbon black, acetylene black, ketjen black, a carbon fiber and the like; a metal-based material of a metal powder or a metal fiber including copper, nickel, aluminum, silver, and the like; a conductive polymer such as a polyphenylene derivative; or a mixture thereof.

The current collector may include Al.

The electrolyte may include a non-aqueous organic solvent and a lithium salt.

The non-aqueous organic solvent may serve as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. The ester-based solvent may include methyl acetate, ethyl acetate, n-propyl acetate, dimethyl acetate, methyl propionate, ethyl propionate, decanolide, mevalonolactone, caprolactone, or the like. The ether-based solvent may include dibutyl ether, tetraglyme, diglyme, dimethoxyethane, 2-methyltetrahydrofuran, tetrahydrofuran, or the like. The ketone-based solvent may include cyclohexanone, or the like. The alcohol-based solvent may include ethyl alcohol, isopropyl alcohol, and the like, and in an implementation the aprotic solvent may include, e.g., nitriles such as R-CN (where R may be a C2 to C20 linear, branched, or cyclic hydrocarbon, and may include a double bond, an aromatic ring, or an ether bond), amides such as dimethylformamide, dioxolanes such as 1,3-dioxolane, sulfolanes, and the like.

The organic solvent may be used alone or in a mixture. If the organic solvent is used in a mixture, the mixture ratio may be controlled in accordance with a desirable battery performance, and it may be well known to those skilled in the related art.

The carbonate-based solvent may include a mixture with a cyclic carbonate and a linear carbonate. The cyclic carbonate and linear carbonate may be mixed together in a volume ratio of about 1:1 to about 1:9, and if the mixture is used as an electrolyte, it may have enhanced performance.

The organic solvent may further include an aromatic hydrocarbon-based solvent as well as the carbonate-based solvent. The carbonate-based solvent and aromatic hydrocarbon-based solvent may be mixed together in a volume ratio of about 1:1 to about 30:1.

The aromatic hydrocarbon-based organic solvent may be an aromatic hydrocarbon-based compound represented by Chemical Formula 1.

[Chemical Formula 1]

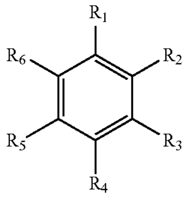

In Chemical Formula 1, $R_1$ to $R_6$ may be the same or different and may be, e.g., hydrogen, a halogen, a C1 to C10 alkyl group, a haloalkyl group, or a combination thereof.

In an implementation the aromatic hydrocarbon-based organic solvent may be, e.g., benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, or a combination thereof.

The electrolyte may further include vinylethyl carbonate, vinylene carbonate, an ethylene carbonate-based compound represented by Chemical Formula 2 as an additive for improving cycle life.

[Chemical Formula 2]

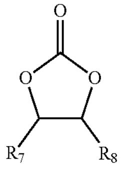

In Chemical Formula 2, $R_7$ and $R_8$ may be the same or different and may each be independently hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group, and $R_7$ and $R_8$ are not simultaneously hydrogen.

In an implementation, the ethylene carbonate-based compound may be, e.g., difluoro ethylene carbonate, chloroethylene carbonate, dichloroethylene carbonate, bromoethylene carbonate, dibromoethylene carbonate, nitroethylene carbonate, cyanoethylene carbonate, fluoroethylene carbonate, or the like. An amount of the additive for improving the cycle-life characteristics may be used within an appropriate range.

The lithium salt dissolved in an organic solvent may supply a battery with lithium ions, basically operate the rechargeable lithium battery, and may improve transportation of the lithium ions between a positive electrode and a negative electrode. In an implementation, the lithium salt may include at least one or two supporting salts, e.g., $LiPF_6$, $LiBF_4$, $LiSbF_6$, $LiAsF_6$, $LiN(SO_2C_2F_5)_2$, $Li(CF_3SO_2)_2N$, $LiN(SO_3C2F_5)_2$, $Li(FSO_2)_2N$ (lithium bis(fluorosulfonyl) imide: LiFSI), $LiC_4F_9SO_3$, $LiClO_4$, $LiAlO_2$, $LiAlCl_4$, $LiPO_2F_2$, $LiN(C_xF_{2x+1}SO_2)(C_yF_{2y+1}SO_2)$, wherein x and y may be natural numbers, e.g., an integer of about 1 to about 20, lithium difluoro(bisoxolato) phosphate), LiCl, LiI, $LiB(C_2O_4)_2$ (lithium bis(oxalato) borate: LiBOB) and lithium difluoro(oxalato)borate (LiDFOB). A concentration of the lithium salt may range from about 0.1 M to about 2.0 M. If the lithium salt is included at the above concentration range, an electrolyte may have excellent performance and lithium ion mobility due to optimal electrolyte conductivity and viscosity.

A separator may be between the positive electrode and the negative electrode depending on a type of a rechargeable lithium battery. The separator may use polyethylene, polypropylene, polyvinylidene fluoride or multi-layers thereof having two or more layers and may be a mixed multilayer such as a polyethylene/polypropylene double-layered separator, a polyethylene/polypropylene/polyethylene triple-layered separator, a polypropylene/polyethylene/polypropylene triple-layered separator, and the like.

Figure 2:
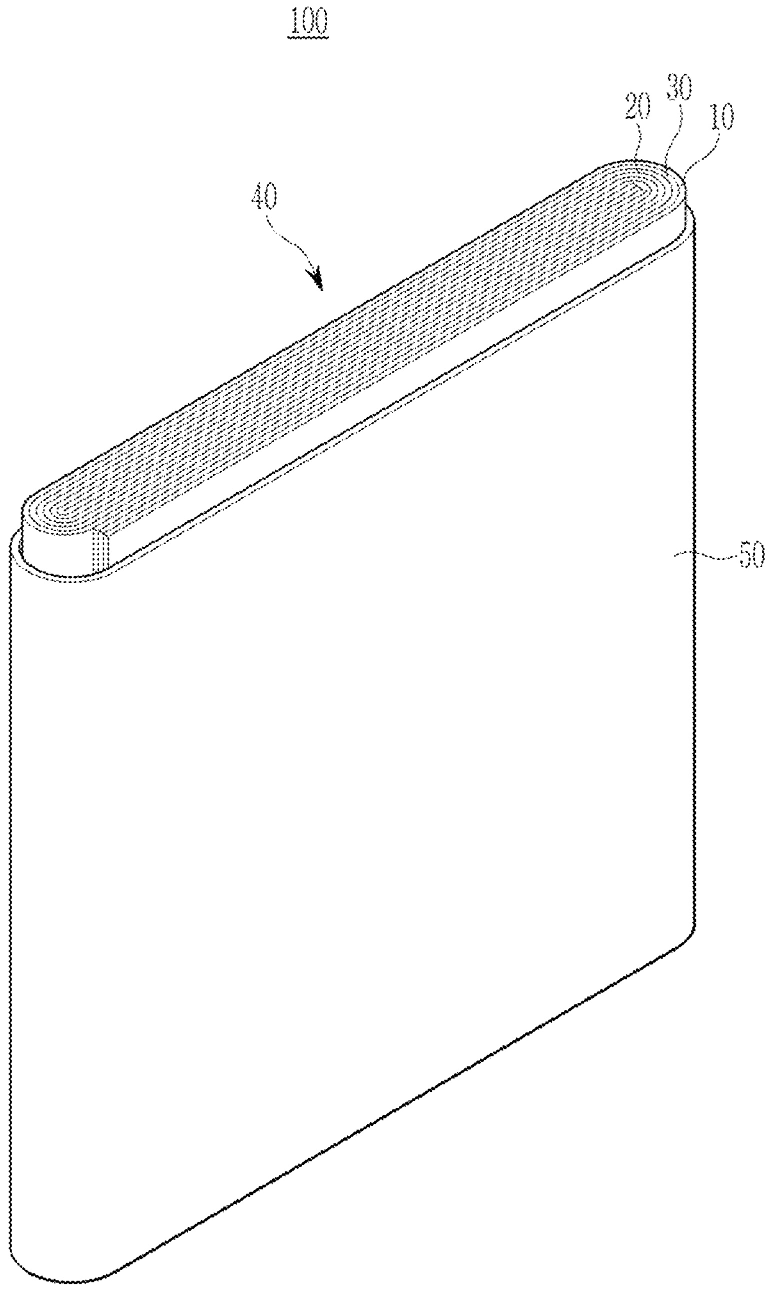
FIG. 2 is a schematic perspective view of a rechargeable lithium battery according to one or more embodiment.

FIG. 2 is a schematic perspective view of a rechargeable lithium battery according to an embodiment. The rechargeable lithium battery according to some embodiments is illustrated as a prismatic battery and may include variously-shaped batteries such as a cylindrical battery, a pouch battery, and the like.

Referring to FIG. 2, a rechargeable lithium battery 100 according to an embodiment may include an electrode assembly 40 manufactured by winding a separator 30 disposed between a positive electrode 10 and a negative electrode 20 and a case 50 housing the electrode assembly 40. An electrolyte may be impregnated in the positive electrode 10, the negative electrode 20 and the separator 30.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1

An ethanol solvent and silicon particles having a particle diameter of several micrometers were mixed at a 9:1 weight ratio and a silicon nano dispersed liquid was prepared by using a beads mill (Netzch, Germany).

A stearic acid dispersant was added to the silicon nano dispersed liquid in order to have a weight ratio of silicon and the dispersant to be 9:1, and a first carbon nanotube (average length: 10 μm) was added to the resulting mixed liquid and primarily agitated. An amount of the first carbon nanotube was used in order to have a solid content to be 0.001 wt % of the primarily mixture.

The obtained mixture was spray-dried at 170° C. using a spray-drier. The resulting spray-dried product included secondary particles agglomerated from a plurality of silicon nano particle and a first carbon nanotube.

The resulting spray-dried product was mixed with meso pitch at a 50:50 weight ratio and a second carbon nanotube (average length: 10 μm) was added to the resulting mixture. An added amount of the carbon nanotube was used in order to have 0.001 wt % of the total amount of the mixture and the carbon nanotube.

The resulting material was heat-treated at a furnace of 900° C. for 2 hours under an $N_2$ atmosphere to prepare an active material which includes a core including secondary particles in which silicon nano particles are agglomerated and the first carbon nanotube, a soft carbon coating layer surrounding the core, and the second carbon nanotube adhered to the soft carbon coating layer. Based on the total 100 wt % of the negative active material, a total amount of the first and the second carbon nanotube was 0.001 wt %, an amount of silicon was 49.999 wt %, and an amount of soft carbon was 50 wt %. The soft carbon coating layer had a thickness of 100 nm.

Using the negative active material as a first negative active material and natural graphite as a second negative active material, a mixture of the first negative active material and the second negative active material (11:89 by weight ratio), a styrene butadiene rubber binder, a carboxymethyl cellulose thickener were mixed at a weight ratio of 96:3:1 in a water solvent to prepare a negative active material slurry.

The negative active material slurry was coated on a Cu foil current collector, dried, and pressurized under a general technique to prepare a negative electrode including the current collector and a negative active material layer on the current collector.

The negative electrode, a $LiCoO_2$ positive electrode, and an electrolyte were used to fabricate a rechargeable lithium cell (full cell). The electrolyte was used by dissolving 1.5 M $LiPF_6$ in a mixed solvent of ethylene carbonate, ethylmethyl carbonate, and dimethyl carbonate (at a volume ratio of 20:10:70).

Comparative Example 1

An ethanol solvent and silicon particles having a particle diameter of several micrometers were mixed at a 9:1 weight ratio and a silicon nano dispersed liquid was prepared by using a beads mill (Netzch, Germany).

A stearic acid dispersant was added to the silicon nano dispersed liquid in order to have a weight ratio of silicon and the dispersant to be 9:1, and a first carbon nanotube (average length: 10 μm) was added to the resulting mixed liquid and primarily agitated. An amount of the first carbon nanotube was used in order to have 0.002 wt % based on the total solid content of the primary mixture.

The primarily agitated mixture was spray-dried at 170° C. using a spray-drier. The resulting spray-dried product included secondary particles agglomerated from a plurality of silicon nano particles and a first carbon nanotube.

The resulting spray-dried product was mixed with meso pitch at a 50:50 weight ratio and the mixture was heat-treated at a furnace of 900° C. for 2 hours under an $N_2$ atmosphere to prepare an active material which included a core including secondary particles in which silicon nano particles were agglomerated and the carbon nanotube, and a soft carbon coating layer surrounding the core.

Based on the total 100 wt % of the negative active material, an amount of the carbon nanotube was 0.001 wt %, an amount of silicon was 49.999 wt %, and an amount of soft carbon was 50 wt %. The soft carbon coating layer had a thickness of 100 nm.

Using the negative active material as a first negative active material and natural graphite as a second negative active material, a mixture of the first negative active material and the second negative active material (11:89 by weight ratio), a styrene butadiene rubber binder, a carboxymethyl cellulose thickener were mixed at a weight ratio of 96:3:1 in a water solvent to prepare a negative active material slurry.

The negative active material slurry was coated on a Cu foil current collector, dried, and pressurized under a general technique to prepare a negative electrode including the current collector and a negative active material layer on the current collector.

The negative electrode, a $LiCoO_2$ positive electrode, and an electrolyte were used to fabricate a rechargeable lithium cell (full cell). The electrolyte was prepared by dissolving 1.5 M $LiPF_6$ in a mixed solvent of ethylene carbonate, ethylmethyl carbonate, and dimethyl carbonate (at a volume ratio of 20:10:70).

Comparative Example 2

A stearic acid dispersant was added to the silicon nano dispersed liquid of Comparative Example 1 in order to have a weight ratio of silicon and the dispersant to be 9:1, and primarily agitated.

The primarily agitated mixture was spray-dried at 170° C. using a spray-drier. The resulting spray-dried product included secondary particles agglomerated from a plurality of silicon nano particles.

The resulting spray-dried product was mixed with meso pitch at a 50:50 weight ratio and a carbon nanotube (average length:10 μm) was added to the mixture. An amount of the first carbon nanotube was used in order to have to be 0.002 wt % of the mixture and carbon nanotube.

The resulting material was heat-treated in a furnace at 900° C. for 2 hours under an $N_2$ atmosphere to prepare an active material which included a core including secondary particles in which silicon nano particles were agglomerated, a soft carbon coating layer, and carbon nanotube adhered to the soft carbon coating layer. The soft carbon coating layer had a thickness of 100 nm.

A negative electrode was prepared by the same procedure as in Example 1, except that the silicon-carbon composite was used as a first negative active material.

Using the negative electrode, the positive electrode of Example 1, and an electrolyte, a rechargeable lithium cell was fabricated.

Comparative Example 3

The primarily agitated mixture according to Comparative Example 2 was spray-dried at 170° C. using a spray-drier. The resulting spray-dried product included secondary particles agglomerated from a plurality of silicon nano particles.

The resulting spray-dried product was mixed with meso pitch at a 50:50 weight ratio and the mixture was heat-treated at a furnace of 900° C. for 2 hours under an $N_2$ atmosphere to prepare an active material. The active material included a core including secondary particles in which silicon nano particles were agglomerated and a soft carbon coating layer formed on the core, and based on the total 100 wt % of the negative active material, an amount of silicon nano particle was 50 wt % and a soft carbon was 50 wt %. The soft carbon coating layer had a thickness of 100 nm.

The negative active material slurry was used to prepare a negative electrode by the same procedure as in Comparative Example 1. Using the negative electrode, the positive electrode of Example 1, and an electrolyte, a rechargeable lithium cell was fabricated.

Comparative Example 4

The first negative active material of Comparative Example 1, a natural graphite second negative active material, a mixture of the first negative active material and the second negative active material (11:89 by weight ratio), a styrene butadiene rubber binder, and a carboxymethyl cellulose thickener were mixed at a weight ratio of 96:3:1 in a water solvent. The second carbon nanotube of 0.05 wt % based on the total amount of the mixture was added to the mixture to prepare a negative active material slurry.

The negative active material slurry was used to prepare a negative electrode by the same procedure as in Comparative Example 1. Using the negative electrode, the positive electrode of Example 1, and an electrolyte, a rechargeable lithium cell was fabricated.

Experimental Example 1) Efficiency Characteristic

The rechargeable lithium cells according to Example 1 and Comparative Examples 1 to 4 were charged and discharged at 0.2C once and the efficiency, which is a ratio of the discharge capacity relative to the charge capacity was measured. The results are shown in Table 1.

Experimental Example 2) Cycle-Life Characteristic

The rechargeable lithium cells according to Example 1, and Comparative Examples 1 to 4 were charged and discharged at 1C for 150 cycles. A ratio of the discharge capacity at each cycle relative to the discharge capacity at the $1^{st}$ cycle was measured. From these results, a ratio of the discharge capacity at the $150^{th}$ cycle relative to the discharge capacity at the $1^{st}$ cycle are shown in Table 1, as a capacity retention.

TABLE 1

| | Capacity (mAh/g) | Efficiency (%) | Cycle-life characteristic (150 cycle, %) |
|---|---|---|---|
| Example 1 | 1573 | 86.3 | 93 |
| Comparative Example 1 | 1638 | 85.8 | 88 |
| Comparative Example 2 | 1590 | 86.0 | 90 |
| Comparative Example 3 | 1620 | 85.2 | 83 |
| Comparative Example 4 | 1650 | 85.5 | 86 |

As shown in Table 1, Example 1 including the negative active material including the core including carbon nanotube and carbon nanotube adhered to an amorphous carbon coating layer exhibited excellent efficiency and cycle-life characteristic.

Whereas, Comparative Examples 1 and 4 using the negative active materials in which carbon nanotube was only included in the core, and Comparative Example 2 using the negative active material in which carbon nanotube was only adhered to the amorphous carbon coating layer exhibited slightly improved efficiency and cycle-life characteristics, rather than Comparative Example 3 using no carbon nanotube. However, all of the cells of Comparative Examples 1, 2, and 4 exhibited poorer than the cell of Example 1, which indicated unsatisfactory improvement effects.

By way of summation and review, rechargeable lithium batteries may include a positive electrode and a negative electrode which may include an active material being capable of intercalating and deintercalating lithium ions, and an electrolyte, and may generate electrical energy due to the oxidation and reduction reaction if lithium ions are intercalated and deintercalated into the positive electrode and the negative electrode.

As a positive active material for a rechargeable lithium battery, transition metal compounds such as lithium cobalt oxide, lithium nickel oxide, lithium manganese oxide, or the like may be mainly used. As a negative active material, crystalline carbon such as natural graphite or artificial graphite, or amorphous carbon material is mainly used, but these carbonaceous materials may have a low capacity of about 360 mAh/g. Thus, the investigation for silicon-based active material such as Si having a capacity of four times or more than that has been actively undertaken.

Silicon-based active materials are recently being used by mixing silicon and carbon-based material which may cause a large volume change during charge and discharge, thereby causing disconnect between active materials and thus, the cycle-life characteristics may be deteriorated.

One or more embodiments provides a negative active material for a rechargeable lithium battery exhibiting improved cycle-life characteristics. Another embodiment provides a rechargeable lithium battery including the negative active material. A negative active material for a rechargeable lithium battery according to one or more embodiments may exhibit excellent cycle-life characteristics.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A negative active material for a rechargeable lithium battery, the negative active material comprising:

a core comprising silicon and a first carbon nanotube;

an amorphous carbon coating layer surrounding the core; and a second carbon nanotube adhered to the amorphous carbon coating layer, wherein the second carbon nanotube is positioned on the surface of the negative active material, and wherein a total amount of the first and second carbon nanotubes is about 0.0001 wt % to 0.009 wt %, based on a total weight of the negative active material.

2. The negative active material for a rechargeable lithium battery as claimed in claim 1, wherein the first and second carbon nanotubes are each independently a single-walled carbon nanotube, a double-walled carbon nanotube, a multi-walled carbon nanotube, or a combination thereof.

3. The negative active material for a rechargeable lithium battery as claimed in claim 1, wherein the first carbon nanotube is a single-walled carbon nanotube, and the second carbon nanotube is a multi-walled carbon nanotube.

4. The negative active material for a rechargeable lithium battery as claimed in claim 1, wherein an amount of the silicon is about 10% to about 80%, based on a total weight of the negative active material.

5. The negative active material for a rechargeable lithium battery as claimed in claim 1, wherein an amount of the silicon is about 10% to about 70%, based on a total weight of the negative active material.

6. The negative active material for a rechargeable lithium battery as claimed in claim 1, wherein the silicon has an average particle diameter of about 10 nm to about 1,000 nm.

7. The negative active material for a rechargeable lithium battery as claimed in claim 1, wherein the silicon has an average particle diameter of about 20 nm to about 900 nm.

8. The negative active material for a rechargeable lithium battery as claimed in claim 1, wherein the amorphous carbon coating layer has a thickness of about 1 nm to about 2 μm.

9. The negative active material for a rechargeable lithium battery as claimed in claim 1, wherein the amorphous carbon coating layer has a thickness of about 1 nm to about 500 nm.

10. The negative active material for a rechargeable lithium battery as claimed in claim 1, wherein the amorphous carbon coating layer has a thickness of about 10 nm to about 300 nm.

11. The negative active material for a rechargeable lithium battery as claimed in claim 1, wherein the amorphous carbon coating layer has a thickness of about 20 nm to about 200 nm.

12. The negative active material for a rechargeable lithium battery as claimed in claim 1, wherein the amorphous carbon coating layer comprises soft carbon, hard carbon, mesophase pitch carbide, sintered cokes, or a combination thereof.

13. The negative active material for a rechargeable lithium battery as claimed in claim 1, wherein the second carbon nanotube has an average length of about 1 μm to about 50 μm.

14. A rechargeable lithium battery, comprising:

a negative electrode including the negative active material as claimed in claim 1;

a positive electrode; and an electrolyte.

15. The negative active material for a rechargeable lithium battery as claimed in claim 1, wherein an amount of the first carbon nanotube included in the negative active material is the same as an amount of the second carbon nanotube included in the negative active material.

16. The negative active material for a rechargeable lithium battery as claimed in claim 1, wherein the core does not include amorphous carbon.

* * * * *